United States Patent [19]

Tamburrino et al.

[11] Patent Number: 5,122,900
[45] Date of Patent: Jun. 16, 1992

[54] MOTORIZED MIRROR ASSEMBLY

[75] Inventors: Richard A. Tamburrino, Auburn; Alan S. Knieriem, Syracuse, both of N.Y.

[73] Assignee: Welch Allyn, Inc., Skaneateles Falls, N.Y.

[21] Appl. No.: 610,693

[22] Filed: Nov. 8, 1990

[51] Int. Cl.$^5$ .................. G02B 23/00; G02B 7/00; A61B 1/00

[52] U.S. Cl. .................. 359/367; 359/198; 359/506; 128/4

[58] Field of Search .............. 359/367, 503, 506, 406, 359/196-198, 896, 820, 871-882, 364-367, 503-506, 402-406, 503-506; 356/241, 242; 128/4-9; 358/98; 73/151

[56] References Cited

U.S. PATENT DOCUMENTS

| | | | |
|---|---|---|---|
| 3,221,593 | 12/1965 | Ferris | 359/506 |
| 4,671,624 | 6/1987 | Kahan | 359/820 |
| 4,787,369 | 11/1988 | Allred, III et al. | 356/241 |
| 4,934,340 | 6/1990 | Ebling et al. | 128/6 |

FOREIGN PATENT DOCUMENTS

| | | | |
|---|---|---|---|
| 83759 | 7/1983 | European Pat. Off. | 356/241 |
| 156612 | 7/1987 | Japan | 358/98 |

*Primary Examiner*—Bruce Y. Arnold
*Assistant Examiner*—Thong Nguyen
*Attorney, Agent, or Firm*—Wall and Roehrig

[57] ABSTRACT

A compact self-contained fail-safe motorized mirror assembly is provided for selective attachment to the end of a borescope insertion tube, attachment is through three self-locking standoff pins threaded on each end for engagement in the mirror assembly housing and the head connector of the insertion tube. One end of each pin and its socket is right-hand threaded and the other is left-hand threaded. A simplified bayonet style battery housing and motor "on/off" switch are provided at the other end of the housing to complete the assembly so that actuation of the motor can only be accomplished by deliberate rotation of the battery housing end and it cannot be accidentally disengaged except by a compound reverse motion of the end cap.

11 Claims, 2 Drawing Sheets

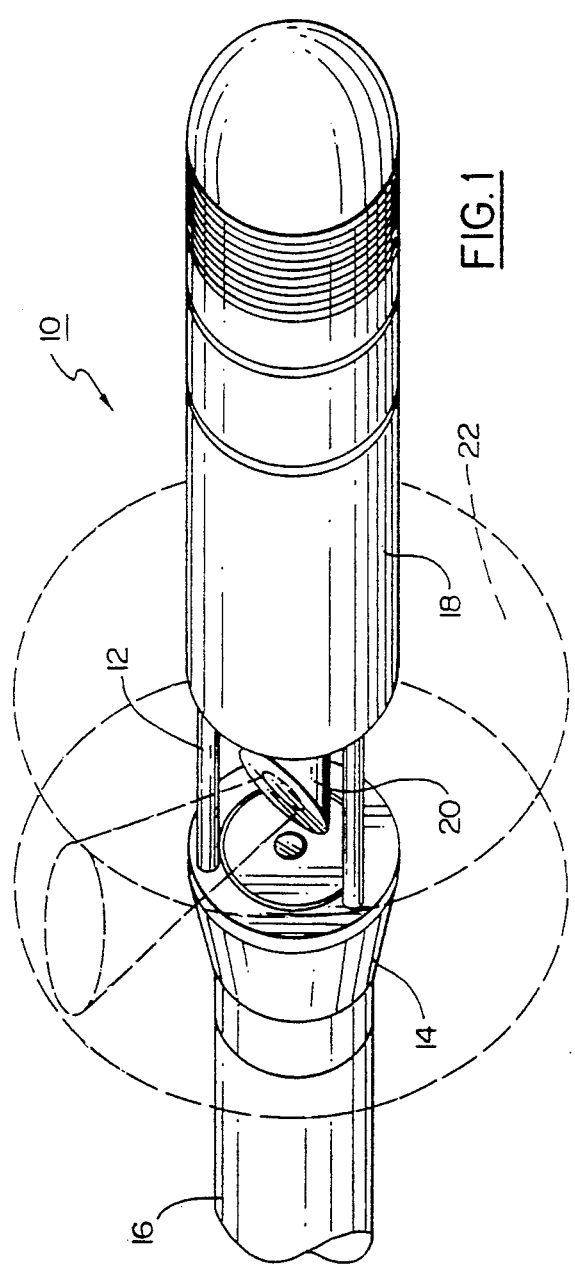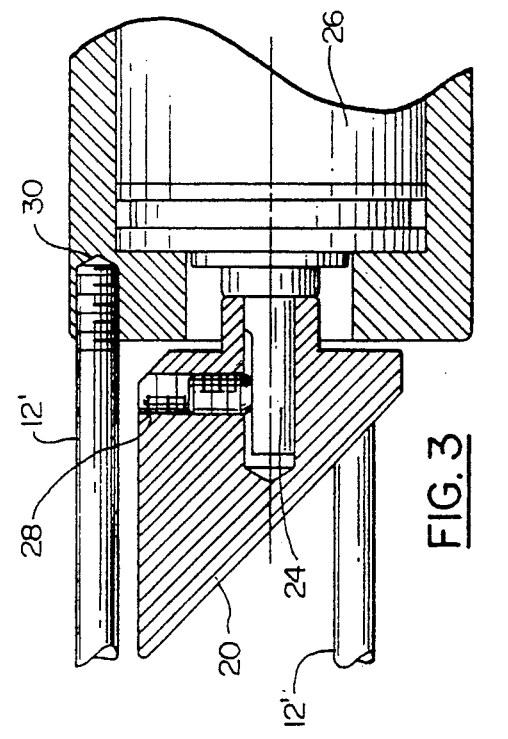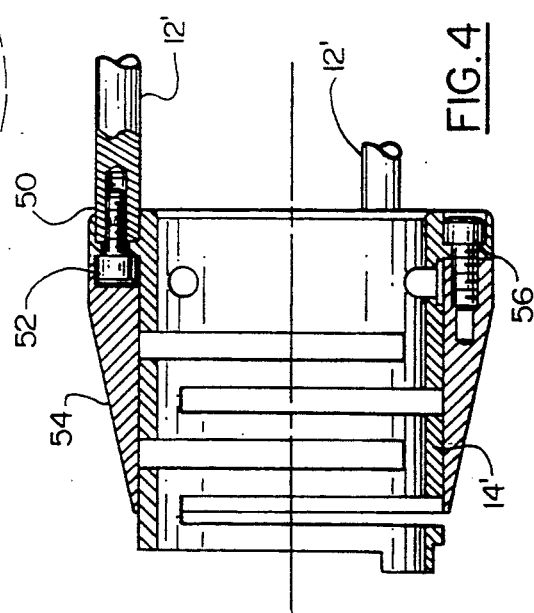

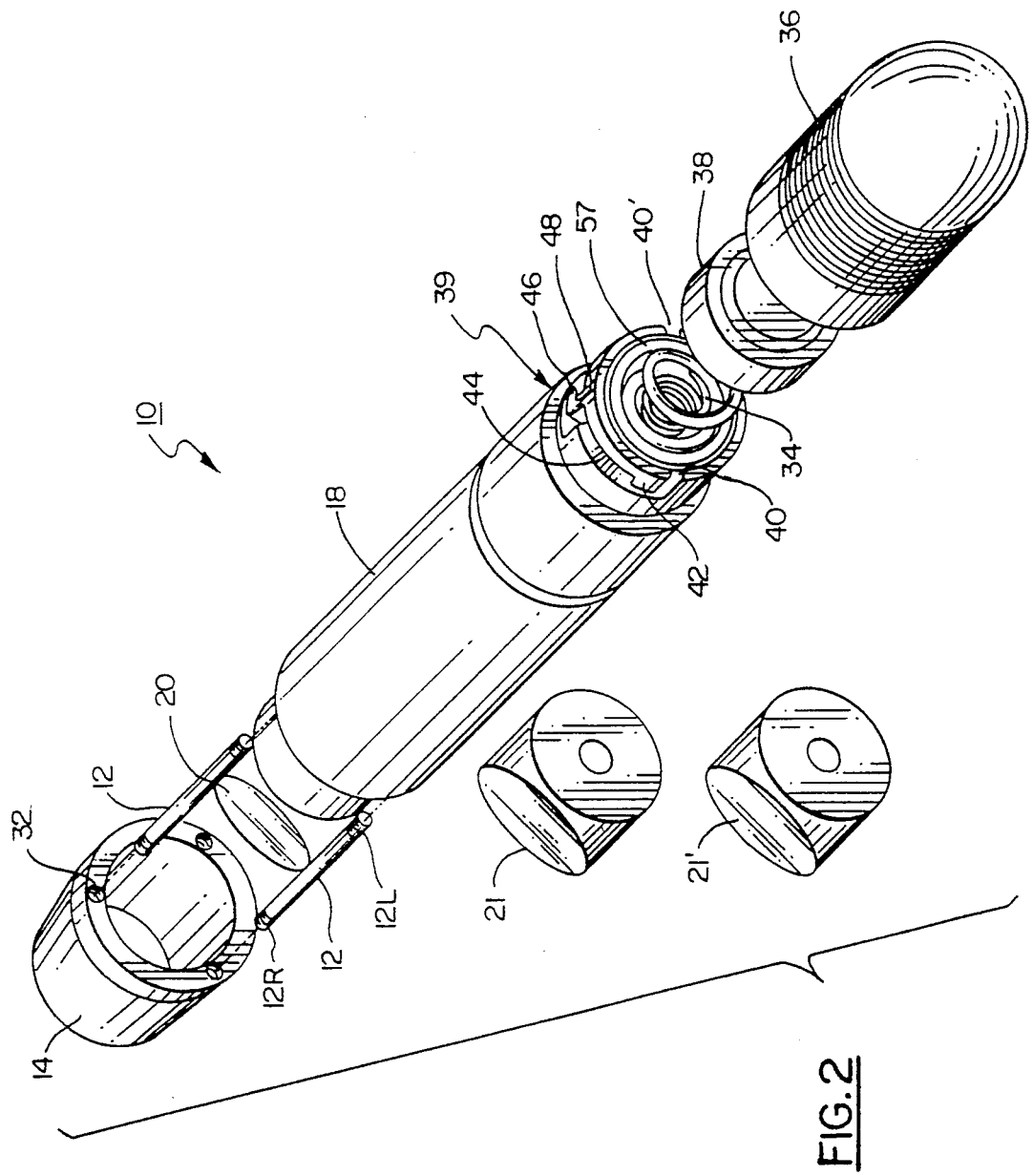

1

MOTORIZED MIRROR ASSEMBLY

BACKGROUND OF THE INVENTION

This invention relates to a mirror assembly attachment for the distal end of a borescope insertion tube, and more particularly to a motorized rotatable mirror for providing a side looking capability in a standard video borescope.

In many industrial applications where borescopes are used, they have to be inserted a considerable distance into inaccessible cavities for viewing the interior thereof. In long, narrow cavities, and particularly in pipes, it is sometimes difficult to distinguish points of interest on the walls thereof looking straight ahead through the distal end of the borescope insertion tube.

Accordingly, for some time it has been a common practice to provide angled mirrors for allowing viewing at an angle .to the axis of the insertion tube of the borescope, including fixed angular mirrors at the end of a standard borescope and various rotated mirrors, all of which to a degree have allowed viewing of the interior surface walls of the enclosure adjacent the tip of the insertion tube. An angled mirror rotating about the axis of the insertion tube produces a so-called side viewing capability for looking at the walls of a pipe, for instance, as the insertion tube is traversed through the pipe. Rotatable mirrors of this type have been used to reflect the source of light in the distal end of the insertion tube onto the wall of the tube, as the mirror rotates and to pick up the reflected video image so as to scan the entire inside circumference of the pipe as the insertion tube is moved through the pipe.

Since in some installations the borescope insertion tube can have a length of ten to fifty feet, it is important that this adaptor, when mounted on the distal end of a borescope insertion tube be securely fixed thereto so it cannot be accidentally dislodged or disengaged and lost in the interior of a narrow elongated cavity such as a steam pipe.

Various types of rotatable motorized mirrors have been available in the art, and have usually included a motorized assembly with battery and rotating mirror which is in some fashion bolted onto an adaptor ring at the distal end of the insertion tube. Various methods have been used to lock the mounting bolts and pins in place, such as glues or cements, set-screws, double nuts and the like. Not only have these locking means been impractical in use, none are one hundred percent fail-safe, and if one of a three pin mount starts to come loose, the others can also come loose and eventually the powered mirror attachment can be lost.

The present invention provides a self contained motorized mirror assembly that may be quickly and easily mounted on the distal end of an insertion tube of a borescope for changing the field of view of a borescope from straight ahead to side looking, together with a fail-safe mounting preventing accidental disengagement.

OBJECTS AND SUMMARY OF THE INVENTION

It is therefore an object of the present invention to overcome the deficiencies of the prior art.

It is another object of the present invention to provide an apparatus for attachment to the distal end of an insertion tube that cannot accidentally become unscrewed from the end of the insertion tube.

It is a further object of the present invention to provide a motorized mirror assembly for attachment to the end of a video probe borescope that can be quickly and easily mounted and dismounted therefrom in a secure fashion and in which interchangeable mirrors can be easily mounted and dismounted for different viewing applications.

It is yet a further object of the present invention to provide a compact self-contained motorized mirror assembly for attachment to the distal end of a borescope insertion tube which has self-locking attaching means and an integral on/off switch and battery cap assembly for controlling the power to the motor for the rotatable mirror.

It is a still further object of the present invention to provide a motorized mirror for attachment to a head connector on the distal end of a borescope insertion tube in a fail-safe manner, and yet which allows interchangeability of the rotatable mirror and simplified fail-safe access to the battery for powering the motor and the switch means for turning the motor on and off.

In one embodiment, this is accomplished with a small compact cylindrical housing having a motor with the shaft extending out one end and the rotatable mirror mounted thereon and a battery cap and bayonet switch at the other end together with self-locking pins at the mirror end adapted to engage into threaded openings in a head connector on the distal end of a borescope insertion tube.

BRIEF DESCRIPTION OF THE DRAWINGS

Further objects of the invention, together with additional features and advantages accruing therefrom will be apparent from the following description of a preferred embodiment which is shown in the accompanying drawings in which:

FIG. 1 is a perspective view of a motorized mirror assembly in accordance with the present invention, attached to the distal end of a borescope insertion tube;

FIG. 2 is an exploded perspective view of the device FIG. 1;

FIG. 3 is a cross-sectional view of the mounting of the interchangeable mirror; and . FIG. 4 is a partial sectional view of another embodiment of the present invention.

DETAILED DESCRIPTION OF A PREFERRED EMBODIMENT

Referring now to FIGS. 1-3, a motorized mirror assembly 10 according to the present invention includes a housing 18 containing a motor/gearbox 26, battery 38, on-off switch assembly and mirror 20 mounted on the head connector 14 of an insertion tube by three standoffs. The three self-locking standoff pins 12 extend from one end of the housing 18 and are adapted to threadably engage the head connector 14 mounted on the distal end of an insertion tube 16 of a borescope. Mounted on a motor shaft 24 extending out of the end of the housing 18 is a mirror 20 which is mounted on the motor shaft 24 for rotation about the axis of the body 18. As shown in dotted lines in FIG. 1, this provides a means whereby the field of view of the borescope is directed radially outward from the axis of the insertion tube to provide an annular field of view 22, shown between the dotted lines in FIG. 1, about the axis of the insertion tube 16. This allows the observer to look at the wall of a pipe, for instance, in which the insertion tube is placed rather than having to look down through the pipe to try and discern what is along the wall or, alternatively, requiring the tip of the insertion tube to be bent ninety degrees to permit viewing of the interior surface of the pipe or other receptacle into which the insertion tube has been placed.

Referring now to FIG. 2, the assembly 10 comprises the housing 18 in which is mounted the gearbox/motor 26 for driving the rotatable mirror 20 about the axis of the housing 18. As shown in FIG. 3, the mirror 20 is mounted on the shaft 24 of the gearbox/motor 26. Shaft 24 has a key and keyway and the mirror 20 is fixed thereon by set screw 28 in the usual fashion for quick and easy interchangeability with other mirror members having different reflective characteristics or angles relative to the axis thereof.

Extending outwardly from this end of the housing 18 are three self-locking standoff pins 12 which extend beyond the end of the mirror 20, as shown in FIGS. 2 and 3, and which are threaded on each end. One threaded end of the pins 12 is threaded into a receptacle 30 in the housing 18 (See FIG. 3), and the other end of the rod 12 is threaded into a receptacle 32 in the head connector 14 of the insertion tube. The three pins serve to mount the motorized mirror assembly 10 and secure it to the end of the insertion tube so that as the mirror is rotated about its axis, the video pickup in the insertion tube distal end can receive images and return them to the borescope display apparatus.

At the other end of the housing 18 battery housing 36 acts as an extension of the housing 18 to enclose a pair of concentric springs, the inner, an electrical contact spring 34 for connecting battery 38 to the motor 26 and the outer spring 57 which provides mechanical retention of the battery housing 36 in the appropriate detente. Also formed in the opposite end of the housing 18 is a bayonet connector for connecting the battery housing 36 to the body 12. As may be seen best in FIG. 2, a groove 40 allows insertion of the cooperating bayonet on the inside of the housing 36 which will enter the groove 40 and be pushed up and over the lug 42 into the recess 44. A similar cooperating arrangement is located at the opposite side of the end of the housing 18, the entrance being marked 40'. Clockwise rotation of the battery housing 36 beyond the initial physical mounting thereof and axial movement to the left in FIG. 2 engages a second lug 46 in the bayonet groove 48 and causes the battery to be electrically connected to the motor 26 through the central spring 34.

Once the battery housing 36 is positioned within the recess 44, the cap is securely held on the housing 18 by spring 57 to form a smooth and continuous enclosure of that end of the motorized mirror assembly 10. The nose 37 of housing 36 is generally spherical to aid in directing the assembly insertion through confined remote areas.

When it is desired to electrically activate the mirror motor/gearbox 26, the housing 36 is pushed further longitudinally toward the mirror and turned clockwise as viewed in FIG. 2, until the electrical contact spring 57 contacts the battery and completes the electrical circuit. The battery is held in the "on" position when the cooperating bayonet inside housing 36 engages in groove 48 and is held there by lug 46. Again, the housing 36 is held in this fully clockwise rotated position by lug 46 so that the contact is completed through spring 34 to cause the battery 38 to power the motor 26.

In operation, the motorized mirror assembly 10 is mounted on the end of the borescope by the standoffs 12 and the battery housing 36 is pushed in and rotated to turn on the motor. The device is then inserted into the area to be inspected. As long as the battery housing 36 is left in the fully clockwise rotated position, the motor will run. In normal usage of the insertion tube 16 with the assembly 10 thereon, the end 36 will not disengage so as to turn off the motor and the mirror will continue to rotate at least until the battery 38 has been discharged.

Referring again to FIG. 2, the three standoffs 12, which are shown threaded at each end are formed with left and right hand threads. respectively, on the ends thereof, so as to form "self-locking" pins that will not be unthreaded by vibration so as to permit disengagement of the mirror assembly 10 from the end of the video probe insertion tube. Thus, as shown in FIG. 2, the near ends of the pins 12 have a left-hand thread and the far ends of the pins 12 have a right-hand thread. The assembly 10 can be simply and easily attached to the head connector 14 by placing the pins between the receptacle 30 in the housing 12 an receptacle 32 in head connector sequentially rotating the pins 12 in a clockwise manner in FIG. 2 sequentially around the circumference from first one to the next and to the next until the standoffs 12 are fully and completely seated in receptacles 32 in the ring 14. At the same time that this is being done, of course, the standoffs 12 are being fully and completely seated in the holes 30 in housing 18 since clockwise rotation of the pins 12 will cause the left-hand threads, on the near ends in FIG. 2 to advance into the holes 30 in the housing until they are securely seated therein.

Once properly installed by sequentially tightening first one and then the other around the circumference, the pins 12 will remain in position indefinitely since if one pin starts to loosen, it will tend to jam the other two by slightly cocking the ring 14 or the housing 18 relative to the rest of the pins and prevent further loosening of the loosened pin or movement of the other two pins. This is to be contrasted with the usual way of joining a cylindrical object together such as a nut and bolt, in which a bolt is inserted through a hole and the nut fastened on the other side. In such a situation, one or more of the nuts can become loosened and fall off and the assembly parted. Should this type of mounting be used for the motorized mirror assembly 10, it would be possible for the device during extended use in a remote pipe or other location to become separated from the end of the insertion tube and lost in the interior of the cavity being inspected. With the left and right hand threaded pins 20, they become self-locking so that not only can the motorized mirror assembly 10 be readily mounted on the ring 14, but the assembly cannot be accidentally dismounted by loosening of the pins 12 due to vibration or other random forces. Since it is highly unlikely that the accidental vibration or other motion would cause first one pin to loosen then the next and the next, sequentially around the circumference of the ring 14 and housing 18 accidental disengagement is eliminated.

As may be seen in FIG. 3, the mirror 20 can be simply and easily removed from the shaft 24 and replaced by an interchangeable mirror having different reflective characteristics for a different angle as may be desired. Mirrors such as 21 or 21' shown in perspective in FIG. 1 may be substituted for the mirror 20, by merely removing one or more of the self-locking pins 12 to permit easy access, and loosening set screw 28 for removal and replacement of the mirrors.

Thus, we have provided a simplified yet fail-safe motorized mirror assembly for mounting on the end of an insertion tube of a borescope such that it cannot be accidentally detached and in which the actuation of the motor is effected in a positive, fail-safe manner also.

Referring now to FIG. 4, there is shown another embodiment of the attachment portion of the present invention in which self-locking pins 12' are right-hand threaded at one end for engagement in recesses 30 in the housing 18, but at the other end the pins 12 have a female right-hand threaded receptacle 50 rather than male threads. This receptacle 50 is formed to receive a captive threaded fastener 52 which is inserted through a hole in ring or flange 56 which forms a part of the head connector 14 on the end of the borescope insertion tube. The flange 56 will have, in the version shown in FIG. 4, three holes through which the captive fasteners 52 can engage the pins 12' to securely mount the assembly 10 on the end of the insertion tube. After the standoffs are secured in housing 18, the captive fasteners 52 are securely threaded into the pins 12, and a faired sleeve 54 is then secured in place abutting the captive fasteners 52. A series of screws 56 spaced about the circumference of the ring 14' completes the assembly and prevents the accidental backing out of the captive fasteners 52 from the pins 12'. It is thus impossible for one of the pins 12 to loosen up so as to permit the other pins to loosen in order for the entire assembly to become disengaged from the end of the insertion tube. Any attempt by a pin 12 to unscrew from the housing 18 would only tend to tighten the captive fastener at the other end and prevent further rotation of the pin in the housing 18. Similarly, the captive fastener 52 cannot start to back out because they are held in tight contact by the faired sleeve 54.

We have thus provided a compact fully self-contained and motorized mirror assembly with a fail-safe attachment to the distal end of a borescope insertion tube for rotating a mirror about the axis thereof to provide a side looking or viewing capability for a borescope for inspection of the remote cavities, such as pipes and the like.

While this invention has been explained with reference to the structure disclosed herein, it is not confined to the details as set forth and this application is intended to cover any modifications and changes as may come within the scope of the following claims.

What is claimed is:

1. In a borescope having an elongated insertion tube with a video imager pick-up for viewing the interior of remote inaccessible spaces, a rotatable mirror assembly for viewing objects displaced from an axis of the insertion tube comprising:
    a head connector on the distal end of the borescope insertion tube having at least three threaded receptacles therein;
    a first cylindrical housing having a battery and motor/gearbox mounted therein with the shaft of the motor/gearbox extending out one end of the housing, said housing end having at least three threaded recesses therein;
    mirror means detachably mounted on the motor shaft at an angle to the axis of said shaft for rotation therewith;
    at least three standoff pins threadably engaging on one end a recess in said cylindrical housing, and on the other end a receptacle in the head connector; and
    means for preventing accidental unscrewing of said standoff pins
    so that said rotatable mirror assembly cannot become disengaged from said insertion tube at a remote location.

2. The mirror assembly according to claim 1 wherein said detachably mounted mirror means includes a plurality of mirrors adapted to be selectively mounted on the motor shaft, each having a different optical/angular characteristic.

3. The mirror assembly according to claim 1 wherein said means for preventing accidental unscrewing of said stand off pins includes one end of said standoff pins being right-hand threaded and the other end left-hand threaded and the corresponding receptacles in said head connector and housing being similarly threaded.

4. The mirror assembly according to claim 1 wherein said means for preventing unscrewing of said standoff pins includes captive screw fasteners engaging one end of said pins and a fixed sleeve member adapted to be mounted in contact with each captive screw to limit movement thereof.

5. The mirror assembly according to claim 1 wherein said means for preventing unscrewing of said standoff pins includes one end of said pins having a female thread therein, an annular collar on the head connector having at least three holes spaced to receive corresponding standoff pins, screw fasteners positioned through said holes into threaded engagement in said female threaded pin ends, and an annular sleeve abutted against said collar and screws to prevent loosening thereof.

6. The mirror assembly according to claim 1 further including a spherical nosed second cylindrical housing rotatably mounted on one end of said first cylindrical housing;
    a battery mounted in said second housing;
    a spring contact member mounted on the end of said first housing extending into said second housing;
    at least one pair of diametrically opposed slots formed in the end of said first housing;
    a corresponding number of bayonets on said second housing adapted to cooperatively engage in said slots so as to axially advance said second housing onto said first housing to cause said spring contact member to complete an electrical circuit from said battery to said motor when said second housing is rotated relative to said first housing.

7. A motorized mirror assembly adapted to be mounted on a distal end of a video borescope for rotating an angularly inclined mirror about an axis of said borescope for viewing objects displaced from the axis of said borescope which comprises in combination:
    an elongated small diameter cylindrical motor housing having motor means mounted therein with a motor means shaft extending out one end of the housing;
    an angularly displaced mirror threadably fixed on the end of the shaft of said motor means;
    a combination battery housing and motor on-off switch rotatably mounted on the other end of said housing; and
    three self-locking standoff pins threaded at each end, positioned about the circumference of the mirror end of the housing, and adapted for threadably engaging said assembly to a corresponding head connector on the distal end of a borescope insertion tube.

8. The mirror assembly of claim 7 wherein the thread on one end of each of said standoff pin is of opposite hand to the thread on the other end.

9. The mirror assembly according to claim 7 wherein said combination battery housing and motor on-off switch includes:
- a battery mounted in said housing;
- a pair of concentric springs mounted on the end of the motor housing extending into said battery housing; one of said springs being conductively connected to the motor means; the other of said springs being mounted to engage said battery housing so that it is spring biased for axial and rotary movement relative to said motor housing, so that an electrical circuit will be completed between said one of said springs and the battery when said battery housing is rotated relative to said motor housing.

10. The mirror assembly of claim 7 further including one end of said self-locking pins having a female thread; a head connector mounted on the distal end of a borescope insertion tube, having positioned therein three captive screw fasteners adapted to engage said female threaded pin ends whereby when said pins have one end threaded into said motor housing, and the other end fastened with said captive screw fasteners, said pins cannot accidentally unscrew.

11. In a borescope having an elongated insertion tube with a video imager pick-up in a distal end thereof for viewing the interior of remote inaccessible spaces, a head connector on the distal end, and a side looking rotatable mirror assembly for viewing objects displaced from an axis of the insertion tube, self-locking mounting means for said mirror assembly comprising:
- three standoff pins adapted to be threadably engaged at one end in the mirror assembly and at the other end in a head connector on the distal end of an insertion tube;
- each of said pins being threaded on each end thereof with one end having a right hand thread and the other having a left hand thread, respectively.

* * * * *